July 12, 1966 CARL-ERNST G. NOURNEY 3,260,864
VARIABLE DELAY TIME PULSE GENERATOR
Filed Sept. 1, 1964
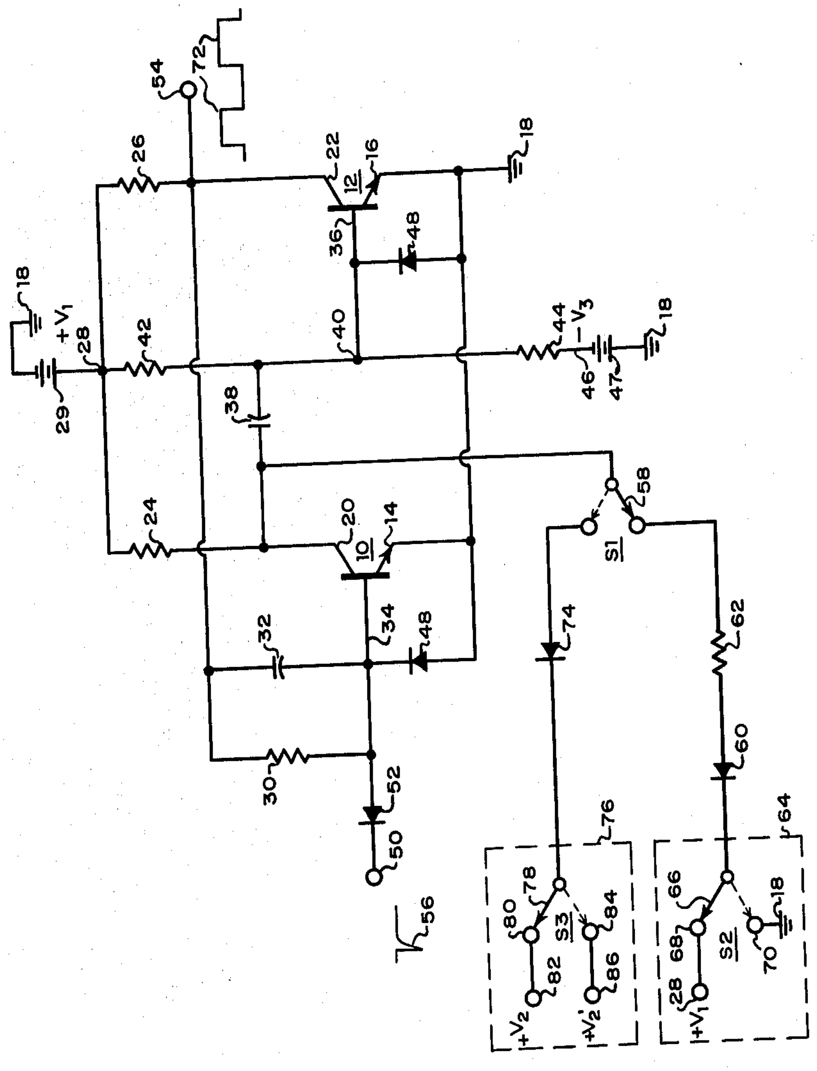
INVENTOR
CARL-ERNST GOTTFRIED NOURNEY
BY A. C. Smith
ATTORNEY United States Patent Office 3,260,864
Patented July 12, 1966

3,260,864

VARIABLE DELAY TIME PULSE GENERATOR

Carl-Ernst G. Nourney, Palo Alto, Calif., assignor to Hewlett-Packard Company, Palo Alto, Calif., a corporation of California Filed Sept. 1, 1964, Ser. No. 393,535
4 Claims. (Cl. 307—88.5)

This invention relates to variable delay time pulse generators and particularly to a multivibrator having at least one unstable state and including means for altering the delay time of the multivibrator.

It is the principal object of this invention to provide a variable delay time pulse generator for generating pulses having selected durations.

Another object of this invention is to provide a pulse generator including means for altering the delay time thereof at a rate as fast as the maximum pulse repetition rate of the pulse generator.

In accordance with the illustrated embodiment of this invention there is provided a monostable multivibrator including a capacitor the charging time of which determines the delay time of the multivibrator. The capacitor is connected to a source of control signal by a diode which is operable in the conductive state to apply the control signal to the capacitor to alter the charge rate thereof.

Other and incidental objects of this invention will be apparent from a reading of this specification and an inspection of the accompanying drawing which illustrates in schematic form a variable delay time pulse generator according to this invention.

Referring to the drawing, there is shown a monostable multivibrator including two transistors 10 and 12 having their respective emitters 14 and 16 connected in common to a point of reference potential 18. The collectors 20 and 22 of transistors 10 and 12 are connected through resistors 24 and 26 to the positive terminal 28 of power supply 29. Power supply 29 applies a positive voltage $V_1$, to the positive supply terminal 28. The other terminal of power supply 29 is connected to the point of reference potential 18. A resistor 30 shunted by capacitor 32 connects the base 34 of transistor 10 to the collector 22 of transistor 12 and to the positive supply terminal 28 through resistor 26 thereby rendering transistor 10 normally conducting. The base 36 of transistor 12 is connected to the collector 20 of transistor 10 through capacitor 38. Base 36 is also connected to the common terminal 40 of resistors 42 and 44 which are serially connected between the positive supply terminal 28 and the negative bias terminal 46 to render transistor 12 normally nonconducting. Power supply 47 applies a negative bias voltage $V_3$ to negative bias terminal 46. The other terminal of power supply 47 is connected to the point of reference potential 18. A diode 48 is connected between the base and the emitter of each of the transistors 10 and 12 to increase the maximum pulse repetition rate of the multivibrator. A trigger input terminal 50 is connected to the base 34 of transistor 10 by diode 52 and an output terminal 54 is connected to the collector 22 of transistor 12.

Operationally, the monostable multivibrator has both a stable or normal state and a quasi-stable state. In the stable state transistor 10 is conducting and transistor 12 is nonconducting. A negative trigger impulse 56 applied to trigger input terminal 50 switches the multivibrator to the quasi-stable state in which transistor 10 is nonconducting and transistor 12 is conducting. During the quasi-stable state capacitor 38 is charged by a charging current flowing essentially through resistor 24, base 36, and emitter 16. When the charging current decreases below a certain value the multivibrator returns to the stable state in which transistor 12 is nonconducting. The delay time of the multivibrator is a function of the supply voltage applied to terminal 28, the bias voltage applied to base 36, and the charging time constant given by the product of the values of resistor 24 and capacitor 38. Therefore, different delay times may be provided by changing either the supply and bias voltages or the charging time constant. Changing both simultaneously is an even more efficient way of varying the delay time, provided both changes tend to vary delay time in the same direction.

To this point a monostable multivibrator has been described; however, for the purposes of this invention an astable multivibrator or a relaxation oscillator of the type well known in the art would serve equally well. According to the invention the multivibrator is provided with at least two selected delay times in either of two ways, as indicated by the alternative positions of the arm 58 of switch S1. By one alternative the anode of diode 60 is connected to the collector 20 of transistor 10 by resistor 62. The cathode of diode 60 is connected to a time delay control circuit 64 including a switch S2 having an actuated and an unactuated state. Switch S2 might be either mechanical or electrical, as for example another multivibrator. If switch S2 is in the unactuated state, as indicated when arm 66 contacts terminal 68, the cathode of diode 60 is connected to the positive supply terminal 28 thereby reverse biasing diode 60 and leaving the normal delay time of the multivibrator unaltered. However, if switch S2 is in the actuated state, as indicated when arm 66 contacts terminal 70, the cathode of diode 60 is connected to the point of reference potential 18, thereby forward biasing diode 60. This simultaneously reduces both the voltage to which capacitor 38 must be charged before termination of the quasi-stable state and the charging time constant, which is then given by the product of the values of capacitor 38 and a resistor equivalent to the parallel combination of resistors 24 and 62, thereby decreasing the delay time of the multivibrator. Thus, by appropriately actuating switch S2 the delay time of the multivibrator may be decreased, for example, from one quarter to one fifth of a microsecond. In this manner it is possible to control the delay time of the multivibrator at a rate as fast as its maximum pulse repetition rate. Two successive cycles of operation of the multivibrator may be produced with different delay times if desired as indicated by the rectangular pulses 72 appearing at output terminal 54. Actuating switch S2 at different times affects the delay time of the multivibrator differently. The control pulse generated by actuating and deactuating switch S2 should be applied to collector 20 during the stable state, either before or at the same time trigger impulse 56 is applied to base 34, for if it is applied during the quasi-stable state the delay time varies continuously with the time of application. But a control pulse applied to collector 20 of transistor 10 during the stable state must not trigger the multivibrator.

Another alternative for varying the delay time of the multivibrator according to this invention is to connect the anode of diode 74 to collector 20 of transistor 10. The cathode of diode 74 is connected to a time delay control circuit 76 including a switch S3 having two actuated states. If switch S3 is in the first actuated state, as indicated when arm 78 contacts terminal 80, the cathode of diode 74 is connected to positive bias terminal 82 at which a positive voltage $V_2$ is applied. The level of voltage $V_2$ is made less than that of voltage $V_1$ applied at positive bias terminal 28, but more than that of the voltage at the collector 20 of transistor 10 during operation of the monostable multivibrator in the stable state in which transistor 10 is conducting and transistor 12 is nonconducting. Thus, diode 74 is reverse biased during operation of the monostable multivibrator in the stable state. During the charging of capacitor 38, when the multivibrator is in the quasi-stable state in which transistor 10 is nonconducting and transistor 12 is conducting, the voltage at the collector 20 of transistor 10 rises towards the level of voltage $V_1$. As the collector voltage exceeds the voltage $V_2$ applied to positive bias terminal 82, diode 74 is forward biased thereby clamping the collector 20 to a voltage slightly higher, by the voltage drop across diode 74, than voltage $V_2$. This terminates the charging of capacitor 38 cutting off the base current supplied to transistor 12 and determining the delay time of the multivibrator. If switch S3 is in the second actuated state, as indicated when arm 78 contacts terminal 84, the cathode of diode 74 is connected to positive bias terminal 86 at which a positive voltage $V_2'$ is applied. Since the level of voltage $V_2'$ is lower than that of voltage $V_2$ applied to terminal 82, the delay time of the multivibrator will be shortened, for the rising collector voltage of transistor 10 will reach the level of $V_2'$ sooner than it would have the level of voltage $V_2$. There is no settling time required in switching between the two possible delay times provided by the time delay control circuit 76. Thus, with the desired voltage $V_2$ or $V_2'$ applied to the cathode of diode 74 when the multivibrator is triggered, there is no deviation in the selected delay time regardless of what voltage was previously applied to the diode 74.

I claim:

1. A multivibrator circuit for producing a pulse of variable duration, said multivibrator circuit comprising:
   - first and second gain elements, each having an input and an output;
   - first circuit means interconnecting said first and second gain elements, said first circuit means including an energy storage device connected between the output of said first gain element and the input of said second gain element for providing the multivibrator circuit with at least one unstable electrical condition in which said first gain element is nonconductive of current and said second gain element is conductive of current for an interval of time during which the output pulse is produced;
   - a unidirectional conducting element having a pair of terminals, one of which is connected to said first circuit means at a point intermediate to said energy storage device and the output of said first gain element for being supplied with an electrical potential;
   - switching means having a plurality of states and being connected to the other terminal of said unidirectional conducting element for supplying a different electrical potential for each of said states to said other terminal to reverse bias said unidirectional conducting element at the beginning of said unstable electrical condition; and
   - second circuit means connected to said energy storage device for altering during said unstable electrical condition the amount of energy stored in said energy storage device to alter the electrical potential supplied to said one terminal so as to forward bias said unidirectional conducting element, whereby said unstable electrical condition is terminated at a different time for each state of said switching means.

2. A multivibrator circuit as in claim 1 wherein said unidirectional conducting element is a diode.

3. A multivibrator circuit as in claim 2 wherein:
   - said energy storage device is a capacitor; and
   - said second circuit means includes a source of electrical potential and resistive means connected in series with said capacitor to provide one of a charge and a discharge circuit for said capacitor.

4. A multivibrator circuit as in claim 3 wherein said multivibrator circuit is a monostable multivibrator circuit.

References Cited by the Examiner

UNITED STATES PATENTS

| | | | |
|---|---|---|---|
| 2,941,096 | 6/1960 | Gunkel | 307—88.5 |
| 3,025,417 | 3/1962 | Campbell | 307—88.5 |
| 3,178,658 | 4/1965 | Henrion | 307—88.5 |

ARTHUR GAUSS, *Primary Examiner.*

J. ZAZWORSKY, *Assistant Examiner.*